(12) United States Patent
Li et al.

(10) Patent No.: US 12,014,373 B2
(45) Date of Patent: Jun. 18, 2024

(54) ARTIFICIAL INTELLIGENCE ENHANCED TRANSACTION SUSPENSION

(71) Applicants: VISA INTERNATIONAL SERVICE ASSOCIATION, San Francisco, CA (US); Yue Li, Foster City, CA (US); Theodore Harris, San Francisco, CA (US); Tatiana Korolevskaya, Foster City, CA (US)

(72) Inventors: Yue Li, Foster City, CA (US); Theodore Harris, San Francisco, CA (US); Tatiana Korolevskaya, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 630 days.

(21) Appl. No.: 17/270,577

(22) PCT Filed: Aug. 13, 2019

(86) PCT No.: PCT/US2019/046399
§ 371 (c)(1),
(2) Date: Feb. 23, 2021

(87) PCT Pub. No.: WO2020/046577
PCT Pub. Date: Mar. 5, 2020

(65) Prior Publication Data
US 2021/0192527 A1 Jun. 24, 2021

Related U.S. Application Data

(60) Provisional application No. 62/725,119, filed on Aug. 30, 2018.

(51) Int. Cl.
*G06Q 20/40* (2012.01)
*G06N 3/048* (2023.01)
(Continued)

(52) U.S. Cl.
CPC ....... *G06Q 20/4016* (2013.01); *G06Q 20/409* (2013.01); *G06Q 20/42* (2013.01); *G06Q 30/0609* (2013.01); *G06N 3/048* (2023.01)

(58) Field of Classification Search
CPC .. G06Q 20/4016; G06Q 20/409; G06Q 20/42; G06Q 30/0609; G06N 3/048
See application file for complete search history.

(56) References Cited

U.S. PATENT DOCUMENTS 7,386,510 B2 * 6/2008 Degen .................. G06Q 20/403
705/38
8,666,841 B1 * 3/2014 Claridge ................ G06Q 30/00
705/26.1

(Continued)

FOREIGN PATENT DOCUMENTS

WO 2018063812 A1 4/2018

OTHER PUBLICATIONS

Estévez et al., Subscription fraud prevention in telecommunications using fuzzy rules and neural networks, 2006, Expert Systems with Applications, vol. 31, Issue 2, pp. 337-344, ISSN 0957-4174, https://doi.org/10.1016/j.eswa.2005.09.028 (Year: 2006).*

(Continued)

*Primary Examiner* — Zeshan Qayyum
*Assistant Examiner* — Taylor S Rak
(74) *Attorney, Agent, or Firm* — K&L Gates LLP

(57) ABSTRACT

A system and method are described which attempt to connect merchants with phone numbers that are known to be associated with fraudulent users.

18 Claims, 7 Drawing Sheets

(51) Int. Cl.
*G06Q 20/42* (2012.01)
*G06Q 30/0601* (2023.01)

(56) References Cited

U.S. PATENT DOCUMENTS

| | | | |
|---|---|---|---|
| 2002/0133721 A1* | 9/2002 | Adjaoute | G06Q 20/40 |
| | | | 726/23 |
| 2002/0194119 A1* | 12/2002 | Wright | G06Q 20/10 |
| | | | 705/38 |
| 2011/0320246 A1 | 12/2011 | Tietzen | |
| 2011/0320249 A1 | 12/2011 | Tietzen et al. | |
| 2014/0066044 A1 | 3/2014 | Ramnani et al. | |
| 2014/0122325 A1 | 5/2014 | Zoldi et al. | |
| 2015/0106260 A1* | 4/2015 | Andrews | G06Q 20/4016 |
| | | | 705/39 |
| 2015/0161620 A1 | 6/2015 | Christner | |
| 2015/0363777 A1 | 12/2015 | Ronca et al. | |
| 2018/0130061 A1* | 5/2018 | Caldera | G06Q 20/34 |

OTHER PUBLICATIONS

International Search Report and Written Opinion of International Application No. PCT/US2018/048358, dated Dec. 4, 2018, 10 pages.

* cited by examiner

ARTIFICIAL INTELLIGENCE ENHANCED TRANSACTION SUSPENSION

CROSS-REFERENCE TO RELATED APPLICATIONS

This application is a national stage entry under 35 U.S.C. 371 of International Patent Application No. PCT/US2019/046399, filed on Aug. 13, 2019, which claims priority from U.S. Provisional Application No. 62/725,119, filed on Aug. 30, 2018, the entire contents of which are hereby incorporated by reference.

BACKGROUND

People continue to try to use fraud to improperly obtain funds from users. As many parties in the electronic payment environment have applied technology to try to prevent fraud, additional technology has become available that makes fraudulent merchants appear more legitimate. Further, the fraudulent merchants attempt to prey on less sophisticated users to obtain funds using the improved technology.

SUMMARY

The following presents a simplified summary of the present disclosure in order to provide a basic understanding of some aspects of the disclosure. This summary is not an extensive overview. It is not intended to identify key or critical elements of the disclosure or to delineate its scope. The following summary merely presents some concepts in a simplified form as a prelude to the more detailed description provided below.

At a high level, fraudulent transactions may cause problems for many parties in an electronic transaction. Attempts at fraudulent transactions may evolve and change. In response, approaches to combat the attempted fraudulent transactions may also evolve and change. By reducing fraud, electronic commerce may operate more effectively.

A system and method are described which attempt to connect merchants with phone numbers that are known to be associated with fraudulent users. In addition, transactions associated with similar phone numbers that have been rejected by similar members of the community also may be rejected as likely being fraudulent. Further, responsible parties are contacted to verify transaction where the responsible parties may be separate from the people that accepted the transaction.

BRIEF DESCRIPTION OF THE DRAWINGS

The invention may be better understood by references to the detailed description when considered in connection with the accompanying drawings. The components in the figures are not necessarily to scale, emphasis instead being placed upon illustrating the principles of the invention. In the figures, like reference numerals designate corresponding parts throughout the different views.

Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meanings have otherwise been set forth herein.

SPECIFICATION

The present invention now will be described more fully with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods, systems, computer readable media, apparatuses, components, or devices. Accordingly, the present invention may take the form of an entirely hardware embodiment, an entirely software embodiment, or an embodiment combining software and hardware aspects. The hardware may be local, may be remote or may be a combination of local and remote. The following detailed description is, therefore, not to be taken in a limiting sense.

Figure 1:
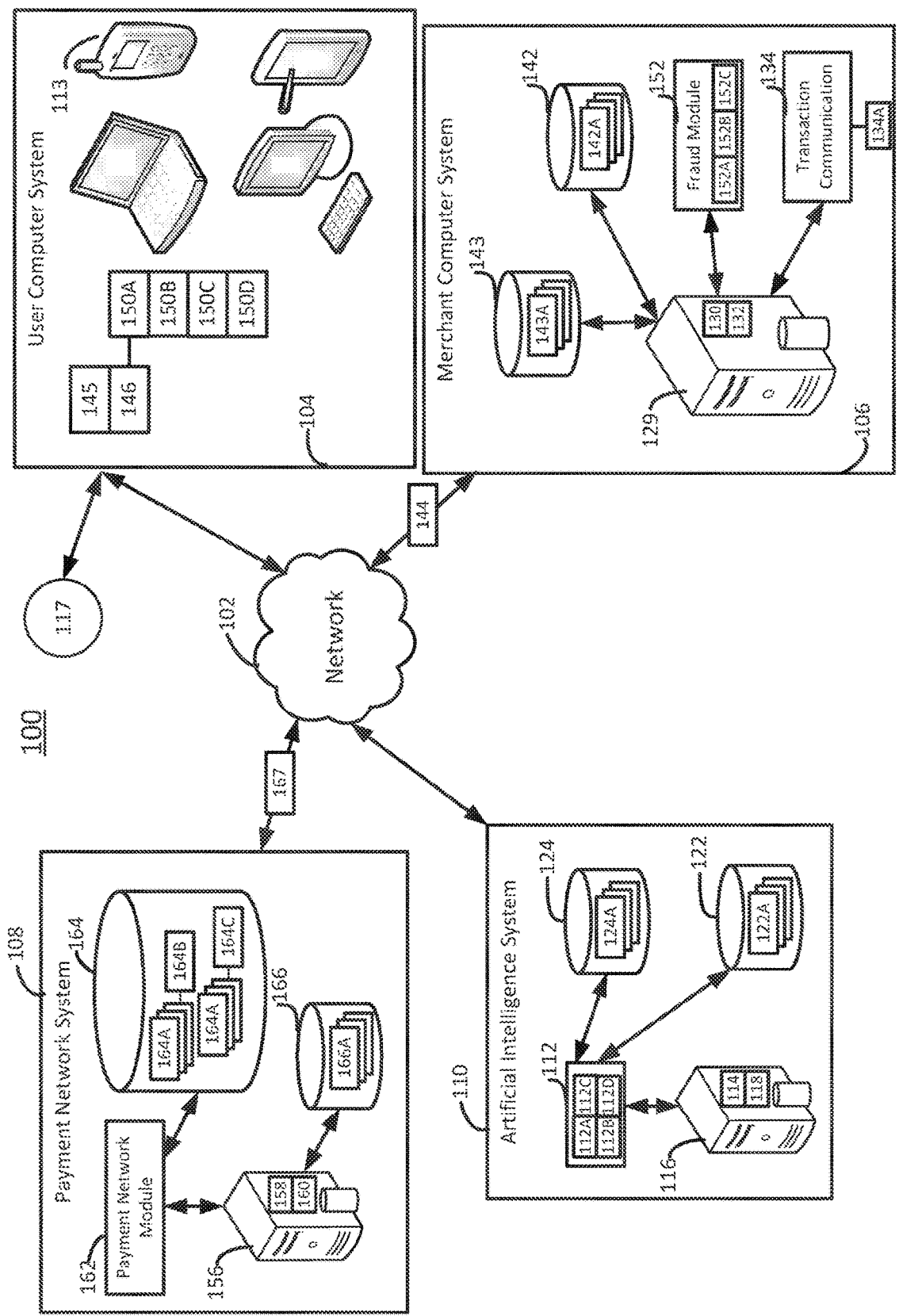
FIG. 1 shows an illustration of an exemplary payment system for determining a real-time optimal price for an item.

FIG. 1 generally illustrates one embodiment of a payment system 100 for determining whether a phone number related to the transaction indicates the transaction may be fraudulent. The system 100 may include a computer network 102 that links one or more systems and computer components. In some embodiments, the system 100 includes a user computer system 104, a merchant computer system 106, a payment network system 108, and a fraud calculation system which may embody artificial intelligence 110.

The network 102 may be described variously as a communication link, computer network, internet connection, etc. The system 100 may include various software or computer-executable instructions or components stored on tangible memories and specialized hardware components or modules that employ the software and instructions to identify related transaction nodes for a plurality of transactions by monitoring transaction communications between users and merchants.

The various modules may be implemented as computer-readable storage memories containing computer-readable instructions (i.e., software) for execution by one or more processors of the system 100 within a specialized or unique computing device. The modules may perform the various tasks, methods, blocks, sub-modules, etc., as described herein. The system 100 may also include both hardware and software applications, as well as various data communications channels for communicating data between the various specialized and unique hardware and software components.

Networks are commonly thought to comprise the interconnection and interoperation of hardware, data, and other entities. A computer network, or data network, is a digital telecommunications network which allows nodes to share resources. In computer networks, computing devices exchange data with each other using connections, i.e., data links, between nodes. Hardware networks, for example, may include clients, servers, and intermediary nodes in a graph topology. In a similar fashion, data networks may include data nodes in a graph topology where each node includes related or linked information, software methods, and other data. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications or data network. A computer, other device, set of related data, program, or combination thereof that facilitates, processes information and requests, and/or furthers the passage of information from a source user to a destination user is commonly referred to as a "node." Networks generally facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

A user computer system 104 may include a processor 145 and memory 146. The user computing system 104 may include a server, a mobile computing device, a smartphone, a tablet computer, a Wi-Fi-enabled device, wearable computing device or other personal computing device capable of wireless or wired communication, a thin client, or other known type of computing device. The memory 146 may include various modules including instructions that, when executed by the processor 145 control the functions of the user computer system generally and integrate the user computer system 104 into the system 100 in particular. For example, some modules may include an operating system 150A, a browser module 150B, a communication module 150C, and an electronic wallet module 150D. In some embodiments, the electronic wallet module 150D and its functions described herein may be incorporated as one or more modules of the user computer system 104. In other embodiments, the electronic wallet module 150D and its functions described herein may be incorporated as one or more sub-modules of the payment network system 108. In some embodiments, a responsible party 117 is in communication with the user computer system 104.

In some embodiments, a module of the user computer system 104 may pass user payment data to other components of the system 100 to facilitate determining a real-time fraud determination. For example, one or more of the operating system 150A, a browser module 150B, a communication module 150C, and an electronic wallet module 150D may pass data to a merchant computer system 106 and/or to the payment network system 108 to facilitate a payment transaction for a good or service. Data passed from the user computer system 104 to other components of the system may include a customer name, a customer ID (e.g., a Personal Account Number or "PAN"), address, current location, and other data.

The merchant computer system 106 may include a computing device such as a merchant server 129 including a processor 130 and memory 132 including components to facilitate transactions with the user computer system 104 and/or a payment device 200 (FIG. 2) via other entities of the system 100. In some embodiments, the memory 132 may include a transaction communication module 134. The transaction communication module 134 may include instructions to send merchant messages 134A to other entities (e.g., 104, 108, 110) of the system 100 to indicate a transaction has been initiated with the user computer system 104 and/or payment device 200 including payment device data and other data as herein described. The merchant computer system 106 may include a merchant transaction repository 142 and instructions to store payment and other merchant transaction data 142A within the transaction repository 142. The merchant transaction data 142A may only correspond to transactions for products with the particular merchant or group of merchants having a merchant profile (e.g., 164B, 164C) at the payment network system 108.

The merchant computer system 106 may also include a product repository 143 and instructions to store product data 143A within the product repository 143. For each product offered by the merchant computer system 106, the product data 143A may include a product name, a product UPC code, an item description, an item category, an item price, a number of units sold at a given price, a merchant ID, a merchant location, a customer location, a calendar week, a date, a historical price of the product, a merchant phone number(s) and other information related to the product. In some embodiments, the merchant computer system 106 may send merchant payment data corresponding to a payment device 200 (FIG. 2) to the payment network system 108 or other entities of the system 100, or receive user payment data from the user computer system 104 in an electronic wallet-based or other computer-based transaction between the user computer system 104 and the merchant computer system 106.

The merchant computer system 106 may also include a fraud module 152 having instructions to facilitate determining fraudulent transactions offered by the merchant computer system 106 to the user computer system 104. In some embodiments, the fraud module 152 may communicate with one or more of the payment network system 108 and the artificial intelligence engine 110 to receive fraud data 144 from a backend system (e.g., the artificial intelligence engine 110) or to determine the fraud data 144 locally at the merchant computer system 106 via the fraud module 152 and a fraud API 152A.

The fraud API 152A may include instructions to access one or more backend components (e.g., the payment network system 108, the artificial intelligence engine 110, etc.) and/or the local fraud module 152 to configure a fraud graphical interface 152B to dynamically present and apply the fraud data 144 to products or services 143A offered by the merchant computer system 106 to the user computer system 104. A merchant historical fraud determination module 152C may include instructions to mine merchant transaction data 143A and determine a list of past fraudulent phone numbers to get historical fraud information on the merchant.

The payment network system 108 may include a payment server 156 including a processor 158 and memory 160. The memory 160 may include a payment network module 162 including instructions to facilitate payment between parties (e.g., one or more users, merchants, etc.) using the payment system 100. The module 162 may be communicably connected to an account holder data repository 164 including payment network account data 164A.

The payment network account data 164A may include any data to facilitate payment and other funds transfers between system entities (e.g., 104, 106). For example, the payment network account data 164A may include account identification data, account history data, payment device data, etc. The module 162 may also be communicably connected to a payment network system transaction repository 166 including payment network system global transaction data 166A.

The global transaction data 166A may include any data corresponding to a transaction employing the system 100 and a payment device 200 (FIG. 2). For example, the global transaction data 166A may include, for each transaction across a plurality of merchants, data related to a payment or other transaction using a PAN, account identification data, a product or service name, a product or service UPC code, an item or service description, an item or service category, an item or service price, a number of units sold at a given price, a merchant ID, a merchant location, a merchant phone number(s), a customer location, a calendar week, and a date, corresponding to the product data 143A for the product that was the subject of the transaction or a merchant phone number. The module 162 may also include instructions to send payment messages 167 to other entities and components of the system 100 in order to complete transactions between users of the user computer system 104 and merchants of the merchant computer system 106 who are both account holders within the payment network system 108.

The artificial intelligence engine 110 may include one or more instruction modules including an fraud calculation module 112 that, generally, may include instructions to cause a processor 114 of a fraud server 116 to functionally communicate with a plurality of other computer-executable steps or sub-modules, e.g., sub-modules 112A, 112B, 112C, 112D and components of the system 100 via the network 102. These modules 112A, 112B, 112C, 112D may include instructions that, upon loading into the server memory 118 and execution by one or more computer processors 114, dynamically determine fraud data for a product 143A or a merchant 106 using various stores of data 122A, 124A in one more databases 122, 124. As an example, sub-module 112A may be dedicated to dynamically determine fraud based on a telephone number or parts of a telephone number associated with a merchant 106.

Figure 2A:
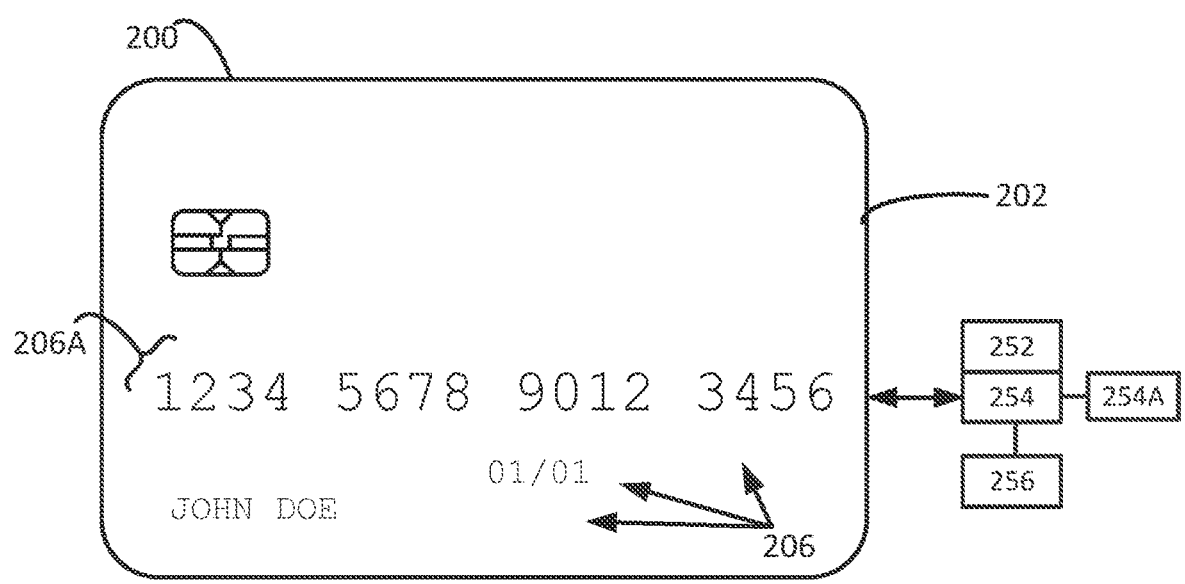
FIG. 2A shows a first view of an exemplary payment device for use with the system of FIG. 1.
Figure 2B:
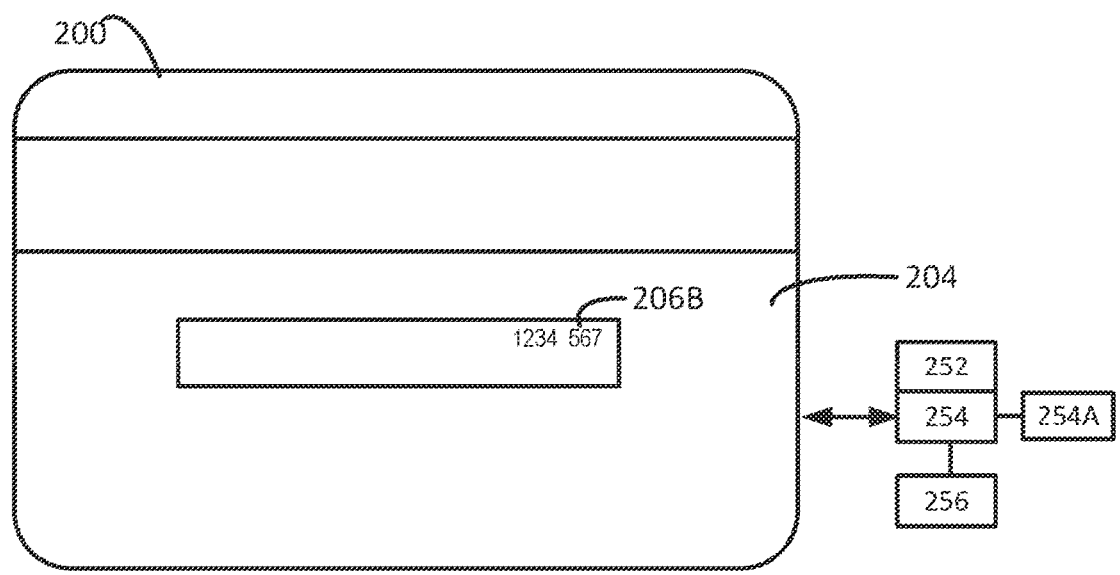
FIG. 2B shows a second view of an exemplary payment device for use with the system of FIG. 1.

With brief reference to FIGS. 2A and 2B, an exemplary payment device 200 may take on a variety of shapes and forms. In some embodiments, the payment device 200 is a traditional card such as a debit card or credit card. In other embodiments, the payment device 200 may be a fob on a key chain, an NFC wearable, or other device. In other embodiments, the payment device 200 may be an electronic wallet where one account from a plurality of accounts previously stored in the wallet is selected and communicated to the system 100 to execute the transaction. As long as the payment device 200 is able to communicate securely with the system 100 and its components, the form of the payment device 200 may not be especially critical and may be a design choice. For example, many legacy payment devices may have to be read by a magnetic stripe reader and thus, the payment device 200 may have to be sized to fit through a magnetic card reader. In other examples, the payment device 200 may communicate through near field communication and the form of the payment device 200 may be virtually any form. Of course, other forms may be possible based on the use of the card, the type of reader being used, etc.

Physically, the payment device 200 may be a card and the card may have a plurality of layers to contain the various elements that make up the payment device 200. In one embodiment, the payment device 200 may have a substantially flat front surface 202 and a substantially flat back surface 204 opposite the front surface 202. Logically, in some embodiments, the surfaces 202, 204 may have some embossments 206 or other forms of legible writing including a personal account number (PAN) 206A and the card verification number (CVN) 206B. In some embodiments, the payment device 200 may include data corresponding to the primary account holder, such as payment network account data 164A for the account holder. A memory 254 generally and a module 254A in particular may be encrypted such that all data related to payment is secure from unwanted third parties. A communication interface 256 may include instructions to facilitate sending payment data 143B, 143A such as a payment payload, a payment token, or other data to identify payment information to one or more components of the system 100 via the network 102.

Figure 3:
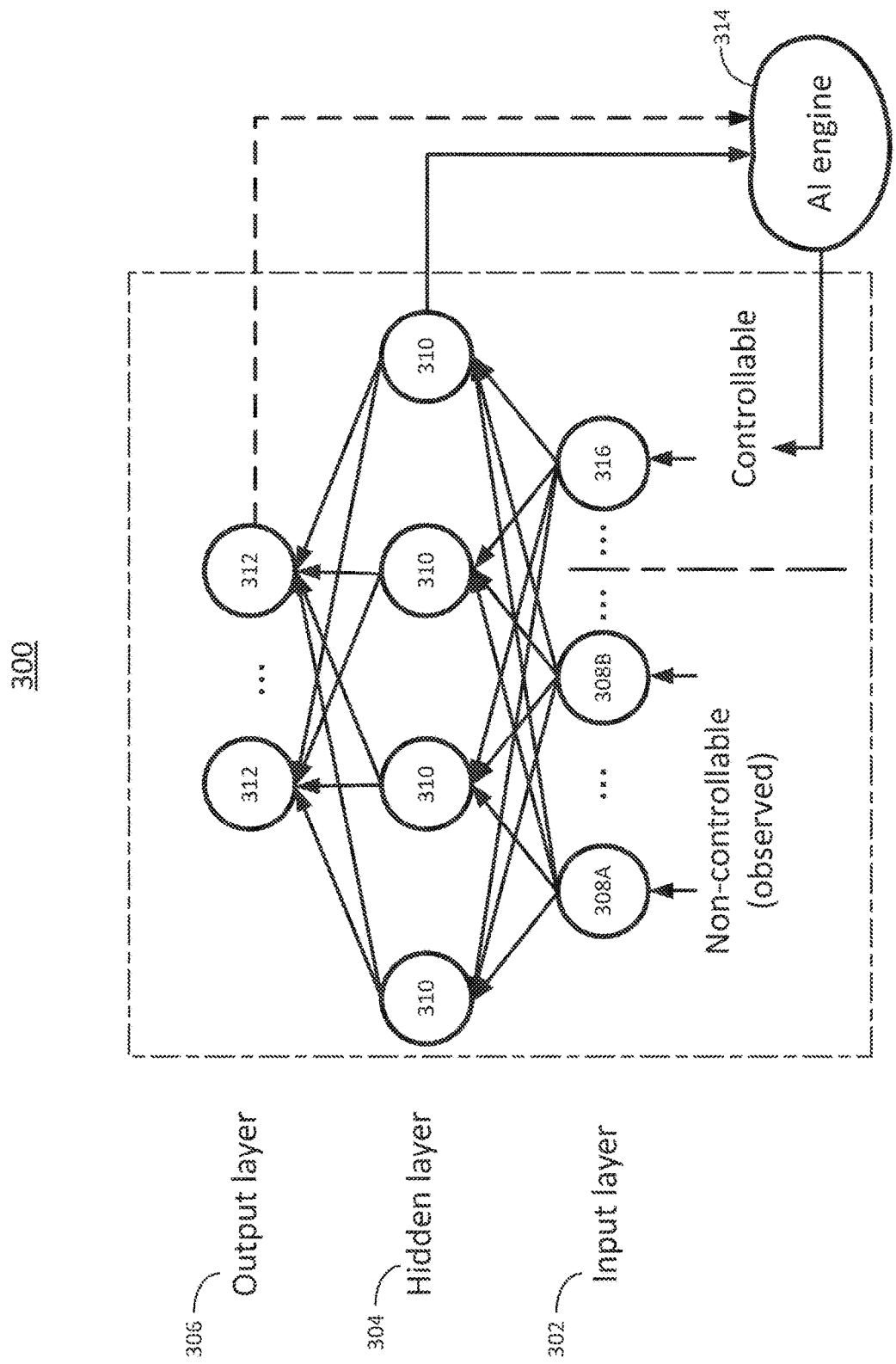
FIG. 3 shows an exemplary machine learning architecture.

With reference to FIG. 3, a machine learning (ML) architecture 300 may be used with the fraud calculation module 112 of system 100 in accordance with the current disclosure. In some embodiments, an AI module 112D of the artificial intelligence system 110 may include instructions for execution on the processor 114 that implement the ML architecture 300. The ML architecture 300 may include an input layer 302, a hidden layer 304, and an output layer 306. The input layer 302 may include inputs 308A, 308B, etc., coupled to the fraud calculation module 112 and represent those inputs that are observed from actual product, customer, and merchant data in the transaction data 142A, 166A. The hidden layer 304 may include weighted nodes 310 that have been trained for the transactions being observed. Each node 310 of the hidden layer 304 may receive the sum of all inputs 308A, 308B, etc., multiplied by a corresponding weight. The output layer 306 may present various outcomes 312 based on the input values 308A, 308B, etc., and the weighting of the hidden layer 304. Just as a machine learning system for a self-driving car may be trained to determine hazard avoidance actions based on received visual input, the machine learning architecture 300 may be trained to analyze a likely outcome for a given set of inputs based on thousands or even millions of observations of previous customer/merchant transactions. For example, the architecture 300 may be trained to determine fraud data 144 to be associated with the product data 143A.

During training of the machine learning architecture 300, a dataset of inputs may be applied and the weights of the hidden layer 310 may be adjusted for the known outcome (e.g., an actual fraud rating for a phone number) associated with that dataset. As more datasets are applied, the weighting accuracy may improve so that the outcome prediction is constantly refined to a more accurate result. In this case, the merchant transaction repository 142 and/or the payment network system repository 166 respectively including transaction data 142A and 166A may provide datasets for initial training and ongoing refining of the machine learning architecture 300.

Additional training of the machine learning architecture 300 may include the an artificial intelligence engine (AI engine) 314 providing additional values to one or more controllable inputs 316 so that outcomes may be observed for particular changes to the transaction data 142A and 166A. The values selected may represent different data types such as selected digits of the phone number, community responses, merchant ratings and other alternative data presented at various points in the transaction process with the product data and may be generated at random or by a pseudo-random process. By adding controlled variables to the transaction process, over time, the impact may be measured and fed back into the machine learning architecture 300 weighting to allow capture of an impact on a proposed change to the process in order to optimize the determination of the fraud data 144. Over time, the impact of various different data at different points in the transaction cycle may be used to predict an outcome for a given set of observed values at the inputs layer 302.

After training of the machine learning architecture 300 is completed, data from the hidden layer may be fed to the artificial intelligence engine 314 to generate values for controllable input(s) 316 to optimize the fraud data 144. Similarly, data from the output layer may be fed back into the artificial intelligence engine 314 so that the artificial intelligence engine 314 may, in some embodiments, iterate with different data to determine via the trained machine learning architecture 300, whether the fraud data 144 is accurate, and other determinations.

Figure 4:
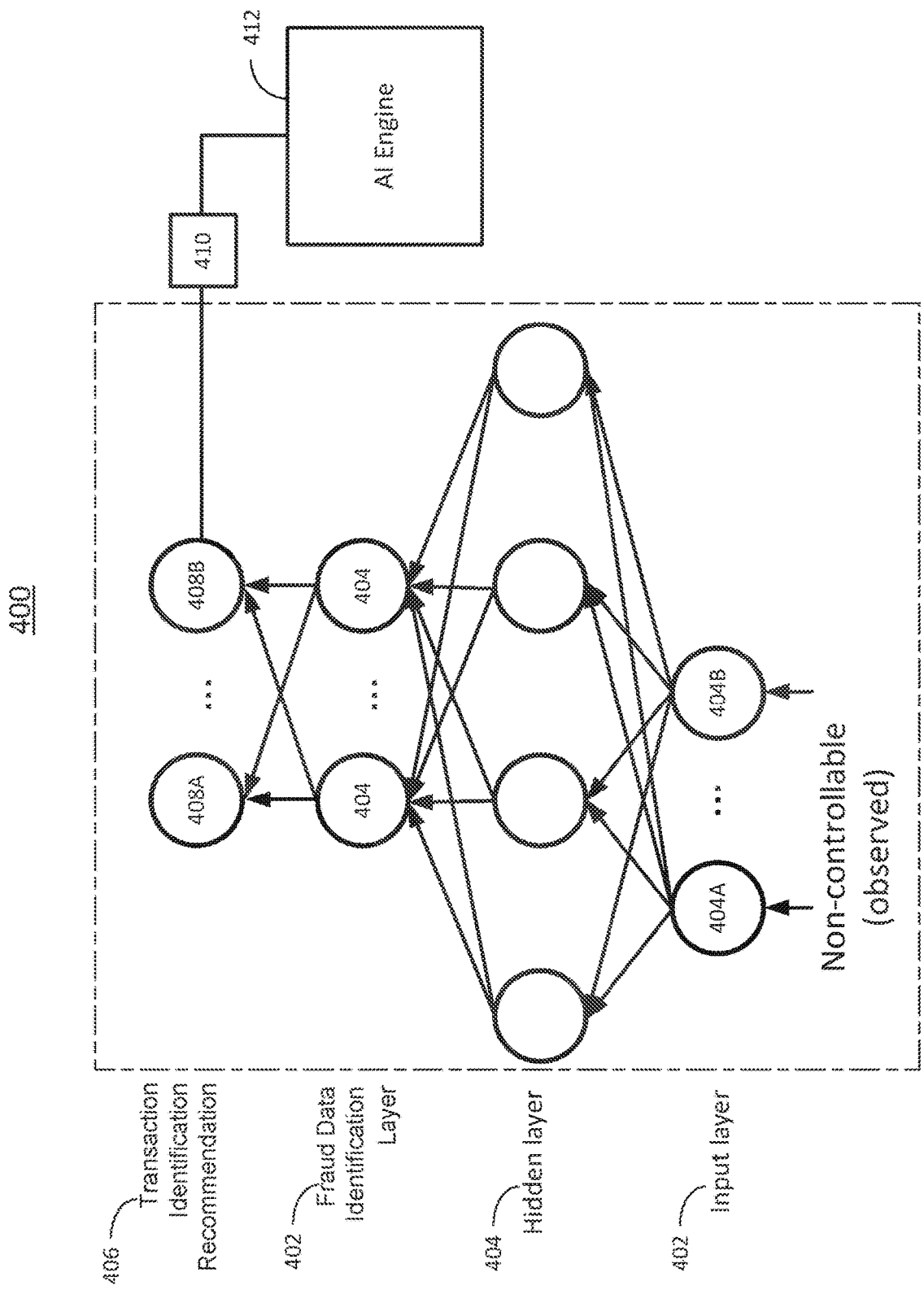
FIG. 4 shows an exemplary artificial intelligence architecture.

With reference to FIG. 4, in other embodiments, the machine learning architecture 300 and artificial intelligence engine 314 may include a second instance of a machine learning architecture 400 and/or an additional node layer may be used. In some embodiments, a fraud data identification layer 402 may determine an optimum fraud determination 404 from observed inputs 404A, 404B. A transaction fraud layer 406 with outputs 408A, 408B, etc., may be used to generate transaction fraud recommendations 410 to an artificial intelligence engine 412, which in turn, may modify one or more of telephone data generally and the fraud data in particular when communicating this data via an appropriate SDK.

Figure 5:
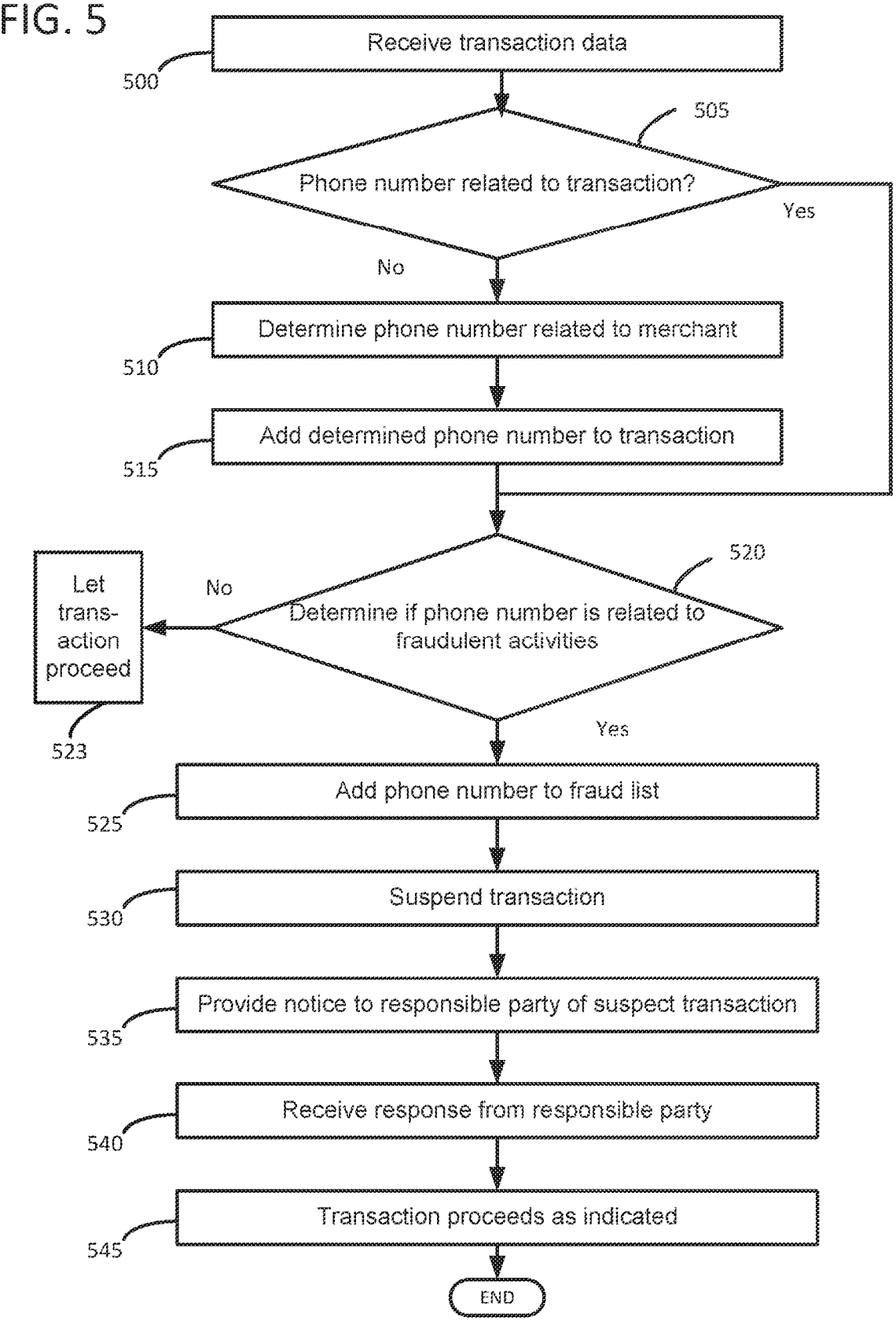
FIG. 5 is a flowchart of a method for determining a real-time optimal price for a product within the system of FIG. 1.

FIG. 5 may illustrate a method that may be executed by the system. At a high level, the method may attempt to detect suspect transactions. Suspect transactions are transactions which may be for a fraudulent good or service. At block 500, purchase information may be received at a payment network system from an electronic purchase device 200. As mentioned previously, the purchase information may contain a variety of information including the merchant name, a transaction value and sometimes a merchant phone number 113 which may be received by a user 104. The electronic purchase device may be any electronic device that is capable of receiving transaction data from a user such as a PAN associated with a credit card. Sample electronic purchase devices may include a Point of Sale (POS) terminal, an e-commerce web server, or an electronic cash register.

At block 505, the method may determine if a phone number 113 for the merchant which may be received or displayed to a user is attached to the purchase information 167. In some payment protocols, a space in the transaction or purchase data 167 is reserved for a merchant phone number 113. In other situations, the merchant name may include a merchant phone number 113. In effect, one goal of the system may be to reduce fraud from spoofed calls to unsuspecting customers. Spoofing may entail displaying a false phone number 113 that may appear to be a legitimate phone number or may be a number with the first six digits, for example, which may look similar to the number of the customer. As the number 113 appears familiar, consumers may be more trusting and may make purchases which turn out to be fraudulent.

If a phone number 113 is not attached to the transaction data, at block 510 the system may use the purchase data 167 that is available to attempt to find a phone number that is associated with the purchase data 167. For example, by searching the merchant name, a phone number 113 may be found. In addition, previous transactions from the same merchant may have phone numbers 113 attached.

At block 515, if the phone number 113 is found, the phone number 113 may be added to the purchase information 167. As a result, future searches of the merchant name may find the phone number 113 and if a phone number 113 has been indicated as being fraudulent in past sales, it may be noted for future sales.

In addition, in some instances, merchants intentionally change their communicated phone number 113 using spoofing type devices. Phone numbers 113 carry data that identifies the caller and the number from which the call originated. As the format of the caller data is known, the caller data may be manipulated by fraudulent merchants to remove the name of the caller, to change the name of the caller, to remove the calling number 113 or to change the calling number 113.

The calling number 113 may be changed in an effort to make the number close to the phone number of the consumer/purchaser. For example, a phone number 113 may have a three digit area code, a three digit local code and a four digit identification code for a total of ten digits. The first six digits may be intentionally made the same as the consumer's phone number such that the consumer may think it is a local number calling.

In addition, the changing of phone numbers 113 or multiple phone numbers 113 for a merchant 106 may be yet another indication that fraud is likely. By saving the variety of phone numbers 113 and noting that the phone numbers 113 change, the system may learn that the merchant 106 is more likely to be fraudulent. In some instances, the merchant 106 may be large and may have a plurality of phone numbers 113 and eventually the phone numbers 113 may be stored repeatedly and the AI engine 110 may learn that a merchant 106 has multiple legitimate phone numbers 113 and the indication of fraud may be reduced.

Related, as will be discussed further, if a phone number 113 is noted as being related to fraud, it may be noted with the stored number. Similarly, the lack of fraud may be noted by the lack of fraud indications attached to a phone number 113.

At block 520, the phone number 113 may be analyzed for fraudulent activities using an artificial intelligence (AI) engine 110. As mentioned previously, an artificial intelligence engine 110 may be a system that takes in a large amount of data and learns from the data. As a simple example, a set of data may be split into four parts. The first part may be used as verification data and the other three data sets may be analyzed as a training set to determine weights to make predictions for the verification data. Then the sets rotate, where the verification data is added to the training data and one of the sets from the training data is used as the verification data. The model runs again and the weights, such as the weights described in FIGS. 3 and 4, are adjusted until all the sets have been used as verification data. Assuming the model is accurate enough or above a threshold, the weights are used to analyze future data and make predictions using the weights as to what the data may mean.

Specific to the data in question, the phone number data 113 may be reviewed by the AI engine 110. The AI engine 110 may analyze the data and learn whether phone numbers 113 for merchant 106 appear fraudulent.

In some embodiments, the phone numbers 113 may be studied in parts. As mentioned previously, fraudulent merchants may attempt to spoof their phone number 113 to appear similar to the number being called, often by making the first several digits of a phone number 113 appear similar to the number being called. By analyzing the data, the various pattern of having the calling number 113 look similar to the receiving number or having the calling number 113 change or having a few digits of the calling number change 113 or having a few of the calling number digits 113 match a previously determined fraudulent number may indicate that the phone number 113 is fraudulent. The use of the AI engine 110 may significantly improve the process of determining whether some or all of the merchant's indicated phone number 113 may be an indication of fraud.

In another aspect, a community of consumers may be analyzed to determine groups of consumers that may be similar for purposes of receiving fraudulent calls. In some situations, fraudulent merchants 106 may target a similar group of people such as senior citizens or residents of a neighborhood. By analyzing communities, patterns of phone numbers 113 that appear fraudulent or have a series of complaints may emerge.

Communities may be determined in a variety of ways and the AI engine 110 may be used to determine the communities. In some embodiments, the communities may be formed using demographic data if such data is available. For example, if users are senior citizens, they may form a group. Similarly, a community may be users in the same zip code or with the same area. In addition, the community may be users that have a similar start to their phone numbers 113 such as similar starting digits of a phone number 113.

The AI engine 110 may create communities or may be used to refine communities. As an example, the AI engine 110 may analyze the senior citizen group and determine which have similar purchase habits. By learning which have similar purchase habits, it may be determined if one of the community has a fraudulent purchase related to a phone number, other members may also have fraudulent purchases.

As mentioned previously, the broader group may be broken into sub-groups. One subgroup may be used as the test group by the AI engine 110 and the other groups may be the training groups to train the AI engine 110. The training may continue until all groups have been used as a test group.

Further, the system and method may review and analyze feedback from the responsible party 117 to assist in determining if a merchant phone number should be classified as fraudulent. For example, a phone caller may convince a customer to buy a good or service over the phone. Shortly thereafter, the customer may realize the phone call was fraudulent and may wish to cancel the transaction. The customer may call the card issuer and request that the transaction be canceled, citing possible fraud. The card issuer may note the phone number 113 associated with the merchant 106. Further transactions that are connected to the fraudulent merchant phone number 113 may be identified as likely being fraudulent.

In addition, the AI engine 110 may review feedback from a community of account holders determined to be similar to determine if a merchant phone number 113 should be classified as fraudulent. If a community of consumers reports possible fraudulent transaction related to a similar merchant phone number 113, transactions from that merchant 106 may be given a higher probability of being fraudulent. For example, if a community of senior citizens is receiving calls for a fraudulent phone number 113, future transactions related to that phone number 113 may be identified as having a higher probability of being fraudulent.

If the telephone number 113 is not connected to any fraud at the current time, the transaction may not be suspended and the transaction may proceed at bloc 523.

At block 525, if the phone number 113 is determined to be fraudulent by the AI engine 110, the phone number 113 may be communicated to the AI engine 110 and the fraud module 152. In some embodiments, fraud determination may involve a score and in such cases, the score may be increased. In other situations, the phone number issue may be one of many factors considered in determining whether fraud is an issue.

At block 530, if the phone number 113 is determined to be fraudulent by the artificial intelligence engine 110, the transaction may be suspended from completing. In some embodiments, the suspension may be automatic without input from the responsible party 117 for the account. In addition, in some embodiments, the suspension may be almost automatic such as when the approval is normally communicated to the merchant.

In other embodiments, the transaction may be suspended for a period of time such that a responsible party 117 may be contacted for approval or rejection of the transaction. In some embodiments, the suspension may be for a suspension period which may be a time sufficient to contact the responsible party 117, such as 24 hours. In some embodiments, without approval, the transaction will be denied at the end of the suspension period.

At block 535, a notice of the attempted fraudulent transaction may be communicated to a responsible party 117 of the account. The communication may contain details of the proposed transaction and the reason the transaction has been suspended. The communication may be in an electronic format such that a response may be received before the end of the suspense period. Example communication formats may include email, SMS message, text message or a notice inside an app which may be in communication with the system. The communication channel may be a channel set up as a default channel or may be selected by a responsible party 117.

The responsible party 117 may be one or more people. Oftentimes, fraudulent merchants 106 attempt to fool consumer, especially less sophisticated consumers, into making a transaction and it may be helpful to have another person be the responsible party 117. As an example, an elderly parent that is not technologically savvy may be persuaded to enter into a proposed transaction with a fraudulent merchant. A notice to a grown child of the elderly parent may be useful in that the grown child may be more technically savvy and may be able to better recognize the transaction as being fraudulent. In addition, numerous children of the elderly parent may be listed as responsible parties 117 and may receive the notification such that if one child is busy or unreachable, others may be able to review the transaction. Of course, the responsible party 117 does not have to be a relative but could be a trusted friend, neighbor, banker, attorney, trustee, etc.

In some embodiments, the responsible party 117 may be computer based logic such a software program or a purpose built server. The computer logic may be remote or may be local. The computer logic may operate using an API where the inquiry is submitted to the logic in a known format or protocol and the response may be return in an expected format or protocol.

At block 540, a response from the responsible party 117 of how to proceed with the transaction may be received by the system. In some embodiments, a default response may be communicated and may occur absent a response from the responsible party 117. For example, the message may state the transaction is going to be cancelled unless a response is received or vice versa. In some embodiments, the message may contain radio type buttons such that a user may simply select the desire radio button ("Approve" or "Decline") and the desired message may be communicated to the system. In other situations, a responsible party 117 may be able to request additional information on the transaction and the reason it is suspended.

At block 545, the transaction may proceed as indicated by the responsible party 117. Again, a default value may be set and the default value may be executed absent contrary instructions from the responsible party 117. In other embodiments, the transaction may remain suspended until a response is received from the responsible party 117.

As mentioned previously, an user interface may be available for consumers and responsible parties to further personalize the system. For example, default values may be set but the values may be adjusted As a simple example, the responsible party 117 may be able to adjust the communication method and the communication address. In more advanced actions, the user may be able to adjust the suspension period, whether suspect transactions are automatically rejected or approved after the suspension period rejection, the people that are listed as responsible parties 117, the level of acceptable risk for a consumer, etc.

As will be recognized by one skilled in the art, in light of the disclosure and teachings herein, other types of computing devices can be used that have different architectures. Processor systems similar or identical to the example systems and methods described herein may be used to implement and execute the example systems and methods described herein. Although the example system 100 is described below as including a plurality of peripherals, interfaces, chips, memories, etc., one or more of those elements may be omitted from other example processor systems used to implement and execute the example systems and methods. Also, other components may be added.

Figure 6:
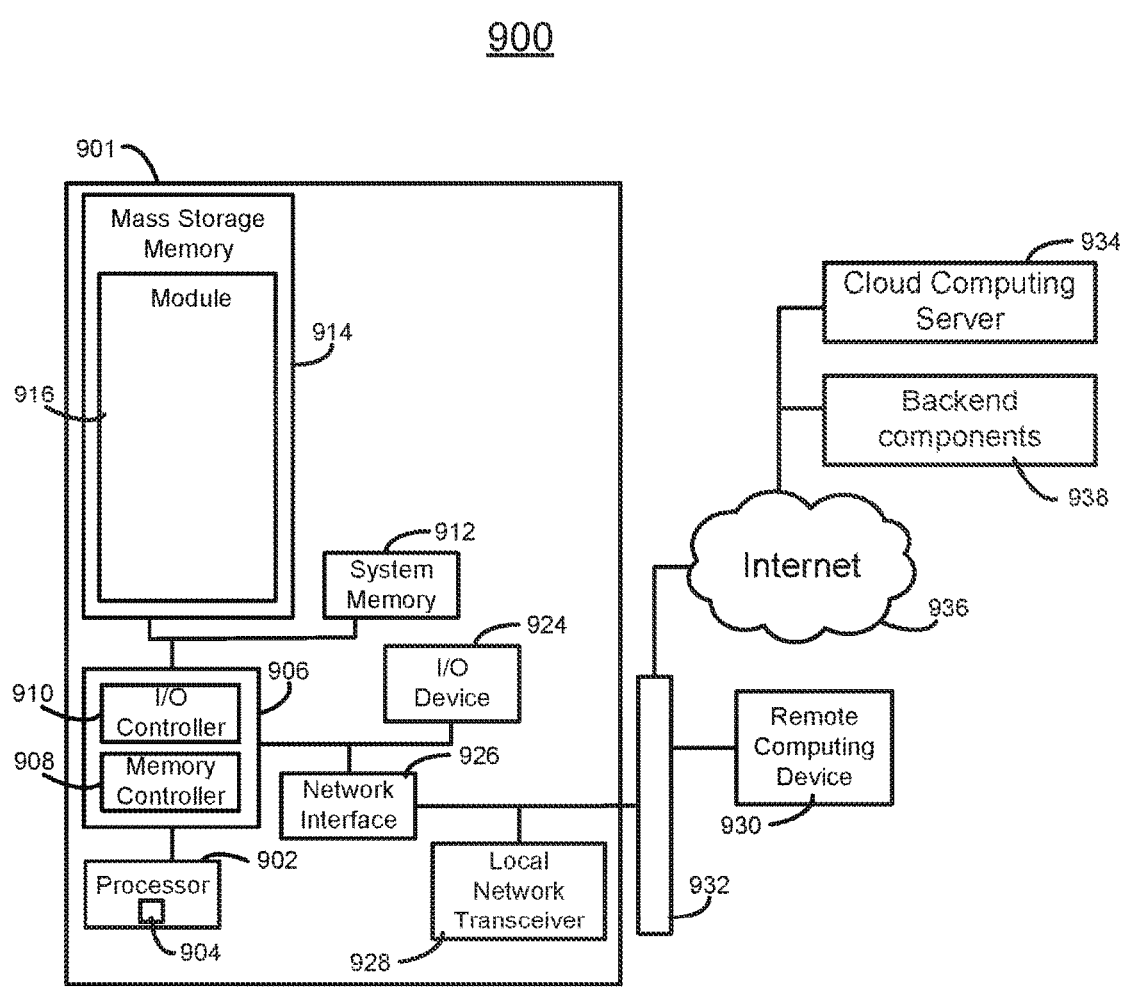
FIG. 6 shows an exemplary computing device that may be physically configured to execute the methods and include the various components described herein.

As shown in FIG. 6, the computing device 901 includes a processor 902 that is coupled to an interconnection bus. The processor 902 includes a register set or register space 904, which is depicted in FIG. 6 as being entirely on-chip, but which could alternatively be located entirely or partially off-chip and directly coupled to the processor 902 via dedicated electrical connections and/or via the interconnection bus. The processor 902 may be any suitable processor, processing unit or microprocessor. Although not shown in FIG. 6, the computing device 901 may be a multi-processor device and, thus, may include one or more additional processors that are identical or similar to the processor 902 and that are communicatively coupled to the interconnection bus.

The processor 902 of FIG. 6 is coupled to a chipset 906, which includes a memory controller 908 and a peripheral input/output (I/O) controller 910. As is well known, a chipset typically provides I/O and memory management functions as well as a plurality of general purpose and/or special purpose registers, timers, etc. that are accessible or used by one or more processors coupled to the chipset 906. The memory controller 908 performs functions that enable the processor 902 (or processors if there are multiple processors) to access a system memory 912 and a mass storage memory 914, that may include either or both of an in-memory cache (e.g., a cache within the memory 912) or an on-disk cache (e.g., a cache within the mass storage memory 914).

The system memory 912 may include any desired type of volatile and/or non-volatile memory such as, for example, static random access memory (SRAM), dynamic random access memory (DRAM), flash memory, read-only memory (ROM), etc. The mass storage memory 914 may include any desired type of mass storage device. For example, the computing device 901 may be used to implement a module 916 (e.g., the various modules as herein described). The mass storage memory 914 may include a hard disk drive, an optical drive, a tape storage device, a solid-state memory (e.g., a flash memory, a RAM memory, etc.), a magnetic memory (e.g., a hard drive), or any other memory suitable for mass storage. As used herein, the terms module, block, function, operation, procedure, routine, step, and method refer to tangible computer program logic or tangible computer executable instructions that provide the specified functionality to the computing device 901, the systems and methods described herein. Thus, a module, block, function, operation, procedure, routine, step, and method can be implemented in hardware, firmware, and/or software. In one embodiment, program modules and routines are stored in mass storage memory 914, loaded into system memory 912, and executed by a processor 902 or can be provided from computer program products that are stored in tangible computer-readable storage mediums (e.g. RAM, hard disk, optical/magnetic media, etc.).

The peripheral I/O controller 910 performs functions that enable the processor 902 to communicate with a peripheral input/output (I/O) device 924, a network interface 926, a local network transceiver 928, (via the network interface 926) via a peripheral I/O bus. The I/O device 924 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The I/O device 924 may be used with the module 916, etc., to receive data from the transceiver 928, send the data to the components of the system 100, and perform any operations related to the methods as described herein. The local network transceiver 928 may include support for a Wi-Fi network, Bluetooth, Infrared, cellular, or other wireless data transmission protocols. In other embodiments, one element may simultaneously support each of the various wireless protocols employed by the computing device 901. For example, a software-defined radio may be able to support multiple protocols via downloadable instructions. In operation, the computing device 901 may be able to periodically poll for visible wireless network transmitters (both cellular and local network) on a periodic basis. Such polling may be possible even while normal wireless traffic is being supported on the computing device 901. The network interface 926 may be, for example, an Ethernet device, an asynchronous transfer mode (ATM) device, an 802.11 wireless interface device, a DSL modem, a cable modem, a cellular modem, etc., that enables the system 100 to communicate with another computer system having at least the elements described in relation to the system 100.

While the memory controller 908 and the I/O controller 910 are depicted in FIG. 6 as separate functional blocks within the chipset 906, the functions performed by these blocks may be integrated within a single integrated circuit or may be implemented using two or more separate integrated circuits. The computing environment 900 may also implement the module 916 on a remote computing device 930. The remote computing device 930 may communicate with the computing device 901 over an Ethernet link 932. In some embodiments, the module 916 may be retrieved by the computing device 901 from a cloud computing server 934 via the Internet 936. When using the cloud computing server 934, the retrieved module 916 may be programmatically linked with the computing device 901. The module 916 may be a collection of various software platforms including artificial intelligence software and document creation software or may also be a Java® applet executing within a Java® Virtual Machine (JVM) environment resident in the computing device 901 or the remote computing device 930. The module 916 may also be a "plug-in" adapted to execute in a web-browser located on the computing devices 901 and 930. In some embodiments, the module 916 may communicate with back end components 938 via the Internet 936.

The system 900 may include but is not limited to any combination of a LAN, a MAN, a WAN, a mobile, a wired or wireless network, a private network, or a virtual private network. Moreover, while only one remote computing device 930 is illustrated in FIG. 6 to simplify and clarify the description, it is understood that any number of client computers are supported and can be in communication within the system 900.

Additionally, certain embodiments are described herein as including logic or a number of components, modules, or mechanisms. Modules may constitute either software modules (e.g., code or instructions embodied on a machine-readable medium or in a transmission signal, wherein the code is executed by a processor) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" or "teaching" means that a particular element, feature, structure, or characteristic described in connection with the embodiment is included in at least one embodiment. The appearances of the phrase "in some embodiments" or "teachings" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Further, the figures depict preferred embodiments for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A method of detecting suspect transactions on an account of a consumer, the method comprising:
    receiving purchase information at a payment network system from an electronic purchase device, wherein the purchase information comprises a name of a merchant and a transaction value;
    determining a phone number for the merchant is attached to the purchase information;
    in response to determining the phone number for the merchant is attached,
        searching for a phone number using the purchase information;
    adding the phone number to the purchase information;
    analyzing the phone number for fraudulent activities using an artificial intelligence (AI) engine comprising a machine learning (ML) architecture, the ML architecture comprising an input layer, a hidden layer and an output layer, wherein the analyzing comprises:
        inputting, by the AI engine, input data into the input layer, wherein the input layer comprises a plurality of inputs, wherein the input data comprises a first portion of the phone number and a second portion of the phone number, wherein the first portion of the phone number is inputted into a first input and the second portion of the phone number is inputted into a second input;
        transforming, by the hidden layer, the input data from the plurality of inputs based on weights associated with nodes of the hidden layer to produce transformed data; and
        determining, by the AI engine, the phone number is fraudulent based on a value of output data provided by the output layer, wherein the output data is based on the transformed data produced by the hidden layer;
    in response to determining the phone number is fraudulent by the AI engine,
        adding the phone number to the AI engine;
        suspending the transaction from completing;
        communicating notice of the transaction to a responsible party of the account;
        receiving a response from the responsible party of how to proceed with the transaction; and
        proceeding with the transaction as indicated by the responsible party.

2. The method of claim 1, wherein the transaction is canceled unless approved by the responsible party.

3. The method of claim 1, wherein notice is communicated using an additional communication channel.

4. The method of claim 1, wherein the notice comprises an explanation of why the transaction is being reviewed.

5. The method of claim 1, wherein the notice is communicated to a separate individual than an account holder.

6. The method of claim 1, wherein the AI engine analyzes a community of consumers determined to be similar.

7. The method of claim 1, wherein if a majority of phone number digits match the phone number digits of the consumer, the transaction is labeled as likely fraudulent.

8. The method of claim 1, wherein the AI engine looks at feedback from the responsible party to assist in determining if a merchant phone number should be classified as fraudulent.

9. The method of claim 1, where the AI engine reviews feedback from a community of account holders determined to be similar to determine if a merchant phone number should be classified as fraudulent.

10. A system for detecting suspect transactions on an account of a consumer, the system comprising:
- a payment network system, the payment network system comprising a first processor physically configured according to first computer executable instructions for:
  - receiving purchase information data from an electronic purchase device wherein the purchase information data comprises a name of a merchant and a transaction value; and
  - determining a phone number for the merchant is attached to the purchase information;
- in response to determining the phone number for the merchant is attached,
  - searching for a phone number using the purchase information;
  - adding the phone number to the purchase information; and
- an artificial intelligence AI engine for analyzing the phone number for fraudulent activities, the AI engine comprising a second processor for implementing a machine learning (ML) architecture, the second processor physically configured according to second computer executable instructions for:
  - inputting input data into an input layer of the ML architecture, wherein the input layer comprises a plurality of inputs, wherein the input data comprises a first portion of the phone number and a second portion of the phone number, wherein the first portion of the phone number is inputted into a first input and the second portion of the phone number is inputted into a second input;
  - transforming, by a hidden layer of the ML architecture, the input data from the plurality of inputs based on weights associated with nodes of the hidden layer to produce transformed data; and
  - determining, by the AI engine, the phone number is fraudulent based on a value of output data provided by an output layer of the ML architecture, wherein the output data is based on the transformed data produced by the hidden layer;
- in response to determining the phone number is fraudulent,
  - adding the phone number to the AI engine;
  - suspending the transaction from completing;
  - communicating notice of the transaction to a responsible party of the account;
  - receiving a response from the responsible party of how to proceed with the transaction; and
  - proceeding with the transaction as indicated by the responsible party.

11. The system of claim 10, wherein the transaction is canceled unless approved by the responsible party.

12. The system of claim 10, wherein notice is communicated using an additional communication channel.

13. The system of claim 10, wherein the notice comprises an explanation of why the transaction is being reviewed.

14. The system of claim 10, wherein the notice is communicated to a separate individual than an account holder.

15. The system of claim 10, wherein the AI engine analyzes a community of consumers determined to be similar.

16. The system of claim 10, wherein if a majority of phone number digits match the phone number digits of the user, the transaction is labeled as likely fraudulent.

17. The system of claim 10, wherein the AI engine looks at feedback from the responsible party to assist in determining if a merchant phone number should be classified as fraudulent.

18. The system of claim 10, where the AI engine reviews feedback from a community of account holders determined to be similar to determine if a merchant phone number should be classified as fraudulent.

* * * * *